(12) United States Patent
Daly

(10) Patent No.: US 11,499,446 B2
(45) Date of Patent: Nov. 15, 2022

(54) SYSTEM AND METHOD FOR DETECTING A SHAFT EVENT ON AN ENGINE

(71) Applicant: PRATT & WHITNEY CANADA CORP., Longueuil (CA)

(72) Inventor: Graeme Daly, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 378 days.

(21) Appl. No.: 16/861,582

(22) Filed: Apr. 29, 2020

(65) Prior Publication Data

US 2021/0340879 A1 Nov. 4, 2021

(51) Int. Cl.
| | |
|---|---|
| *F01D 21/14* | (2006.01) |
| *F02C 9/46* | (2006.01) |
| *G01M 15/14* | (2006.01) |
| *F01D 21/04* | (2006.01) |
| *F01D 21/02* | (2006.01) |
| *F01D 17/06* | (2006.01) |

(52) U.S. Cl.
CPC ............. *F01D 21/14* (2013.01); *F01D 21/02* (2013.01); *F01D 21/04* (2013.01); *F02C 9/46* (2013.01); *G01M 15/14* (2013.01); *F01D 17/06* (2013.01); *F05D 2240/60* (2013.01); *F05D 2270/021* (2013.01); *F05D 2270/09* (2013.01); *F05D 2270/304* (2013.01); *F05D 2270/335* (2013.01)

(58) Field of Classification Search
CPC .......... F01D 21/14; F01D 21/02; F01D 21/04; F01D 17/06; F02C 9/46; F02C 9/28; G01M 15/14; F05D 2240/60; F05D 2270/021; F05D 2270/09; F05D 2270/304; F05D 2270/335; Y02T 50/60
See application file for complete search history.

(56) References Cited

U.S. PATENT DOCUMENTS

| | | | |
|---|---|---|---|
| 6,321,525 | B1 | 11/2001 | Rogers |
| 10,156,190 | B2 | 12/2018 | Coffey et al. |
| 2017/0356302 | A1 | 12/2017 | Descamps et al. |
| 2018/0230853 | A1 | 8/2018 | Jastrzembowski et al. |
| 2018/0274385 | A1* | 9/2018 | Seely .................. G05B 13/042 |

FOREIGN PATENT DOCUMENTS

EP 3040520 7/2016

OTHER PUBLICATIONS

Extended European Search Report dated Sep. 22, 2021, in counterpart European application No. 21171356.5.

* cited by examiner

*Primary Examiner* — Michael V Kerrigan
(74) *Attorney, Agent, or Firm* — Norton Rose Fulbright Canada LLP

(57) ABSTRACT

Methods and systems for detecting a shaft event of a gas turbine engine are described. The method comprises monitoring at least one engine parameter and comparing the at least one engine parameter to a schedule for the at least one parameter defining a first threshold and a second threshold greater than the first threshold; applying a limit to the at least one engine parameter when the at least one engine parameter is inside a parameter limiting region between the first threshold and the second threshold, the first threshold separating the parameter limiting region from a normal operating region, the second threshold separating the parameter limiting region from a hazardous operating region; and detecting the shaft event when the at least one engine parameter crosses the second threshold and issuing a signal in response to the detecting.

20 Claims, 6 Drawing Sheets

SYSTEM AND METHOD FOR DETECTING A SHAFT EVENT ON AN ENGINE

TECHNICAL FIELD

The present disclosure relates generally to gas turbine engines, and more particularly to detection of shaft events on same.

BACKGROUND OF THE ART

The low pressure shaft on an aircraft propulsion gas turbine engine connects the lower pressure turbine to the engine output, such as a propeller for a turboprop, and transfers the power from the turbine to the propeller. The transferred power is then converted into thrust. During engine operation, the shaft experiences very high torsional loads. In the unlikely event of a shaft shear and loss of load, it may be desirable to shut off the engine to prevent damage.

With the rise in fuel prices and the push for environmental sustainability, engines are being designed with less hardware protection in order to save weight and increase specific fuel consumption. Therefore, there is an increasing need for detection of hazardous engine conditions.

SUMMARY

In accordance with a broad aspect, there is provided a method for detecting a shaft event of a gas turbine engine. The method comprises monitoring at least one engine parameter and comparing the at least one engine parameter to a schedule for the at least one parameter defining a first threshold and a second threshold greater than the first threshold; applying a limit to the at least one engine parameter when the at least one engine parameter is inside a parameter limiting region between the first threshold and the second threshold, the first threshold separating the parameter limiting region from a normal operating region, the second threshold separating the parameter limiting region from a hazardous operating region; and detecting the shaft event when the at least one engine parameter crosses the second threshold and issuing a signal in response to the detecting.

In accordance with another broad aspect, there is provided a system for detecting a shaft event of a gas turbine engine. The system comprises a processing unit and a non-transitory computer-readable medium having stored thereon program instructions. The instructions are executable by the processing unit for monitoring at least one engine parameter and comparing the at least one engine parameter to a schedule for the at least one parameter defining a first threshold and a second threshold greater than the first threshold; applying a limit to the at least one engine parameter when the at least one engine parameter is inside a parameter limiting region between the first threshold and the second threshold, the first threshold separating the parameter limiting region from a normal operating region, the second threshold separating the parameter limiting region from a hazardous operating region; and detecting the shaft event when the at least one engine parameter crosses the second threshold and issuing a signal in response to the detecting.

In accordance with yet another broad aspect, there is provided a method for reducing likelihood of a false-positive shutdown of a multi-spool gas turbine engine of an aircraft. The method comprises operating the engine; monitoring operation of the engine at a plurality of points in time, and based on the monitoring, at each point in time of the plurality of points in time, determining a value for at least one engine parameter and comparing the value to a first threshold and a second threshold defining a parameter limiting region, the first threshold separating the parameter limiting region from a normal operating region, the second threshold separating the parameter limiting region from a hazardous operating region; and in response to the at least one parameter being in the parameter limiting region, applying a limit to the at least one engine parameter.

Features of the systems, devices, and methods described herein may be used in various combinations, in accordance with the embodiments described herein. More particularly, any of the above features may be used together, in any combination.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There is described herein methods and systems for detecting a shaft event, such as a shaft shear, a shaft decoupling, and/or a shaft failure in a gas turbine engine. The method involves using a detection threshold, which is defined herein as a value defined by engine parameters that determines when the engine has entered a hazardous condition. In some circumstances, a shaft event may be detected even though the failure conditions for the shaft event are not present, because the detection threshold has been reached. These circumstances are referred to herein as false positives. False positives may be caused for various reasons. For example, there may be a design flaw in the detection threshold or the engine may be operating outside a flight envelope. When the detection threshold is determined empirically through a relationship between certain engine parameters, there may be instances where the relationship is no longer followed, for example due to a change in certain operating conditions such as pressure, airspeed, temperature, etc. These instances may also result in false positives. An additional threshold, referred to herein as a parameter limiting threshold, is used to mitigate the occurrence of false positives.

Figure 1:
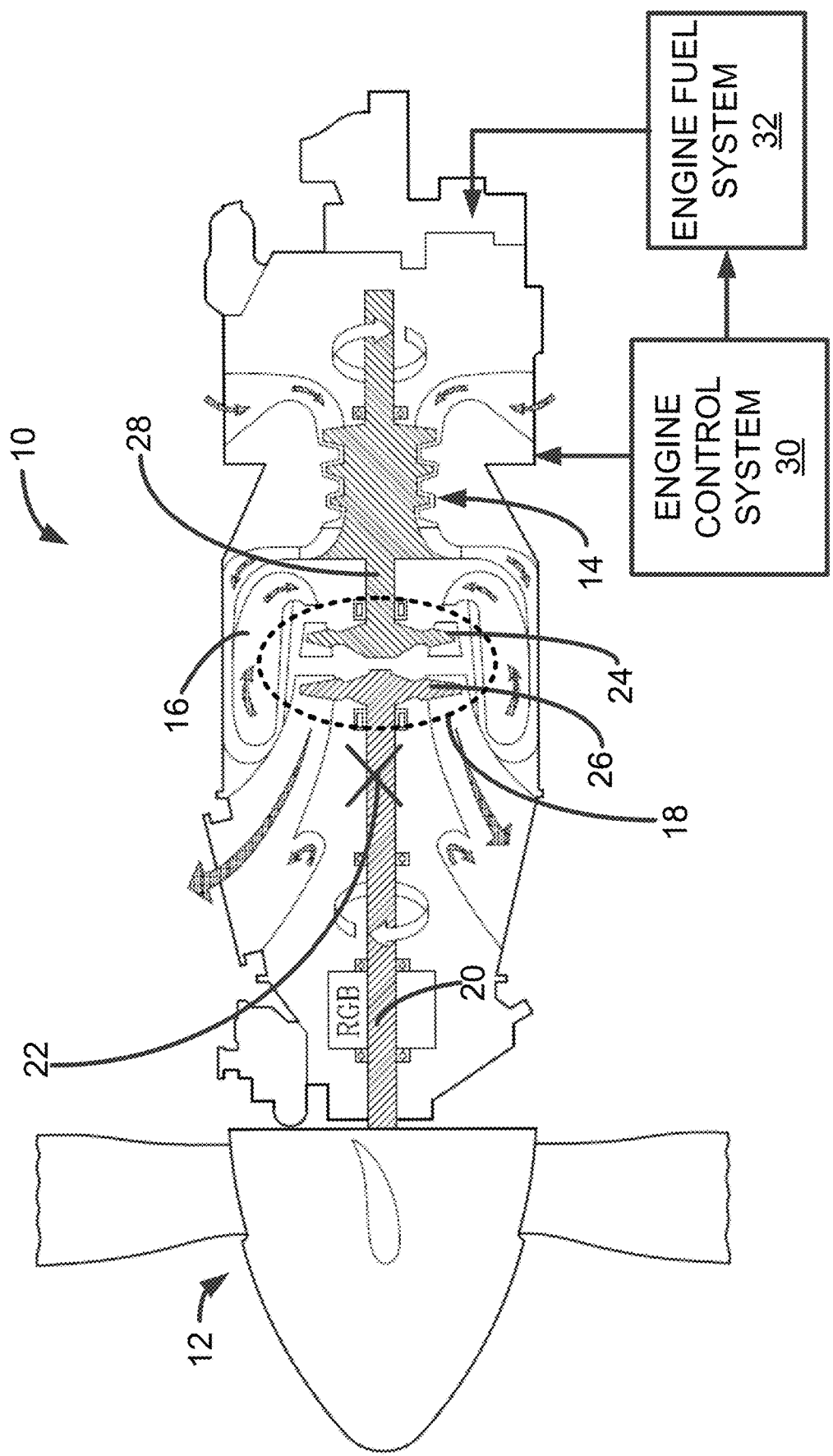
FIG. 1 is a schematic cross-sectional view of an example gas turbine engine.

FIG. 1 illustrates a gas turbine engine 10 for which a shaft event may be detected using the systems and methods described herein. Note that while engine 10 is a turboprop engine, the detection methods and systems described herein may also be applicable to turbofan engines, turboshaft engines and/or any other suitable engines. The detection methods and systems are applicable to engines having two or more spools. In some embodiments, the engine 10 is a three-spool turboprop engine.

Engine 10 generally comprises in serial flow communication a propeller 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. A low pressure spool is composed of a low pressure shaft 20 and a low pressure turbine 26. The low pressure shaft drives the propeller 12. A high pressure spool is composed of a high pressure turbine 24 attached to a high-pressure shaft 28, which is connected to the compressor section 14. A shaft event may occur and be detected at any point 22 along the low pressure shaft 20. In an engine configuration having three spools, namely a low pressure spool, a high pressure spool, and a power turbine spool, a shaft event may occur and be detected at any point along a low pressure shaft of the low pressure spool or a power turbine shaft of the power turbine spool.

An engine control system 30 is operatively coupled to the engine 10 for controlling operation thereof. The engine control system 30 can modulate a fuel flow rate provided to the engine 10, for example via an engine fuel system 32. The engine control system 30 can also modulate the position and/or orientation of variable geometry mechanisms within the engine 10, a bleed level of the engine 10, and the like. The engine fuel system 32 may comprise one or more of fuel tank(s), fuel pump(s), valve(s), filter(s), and the like.

Figure 2A:
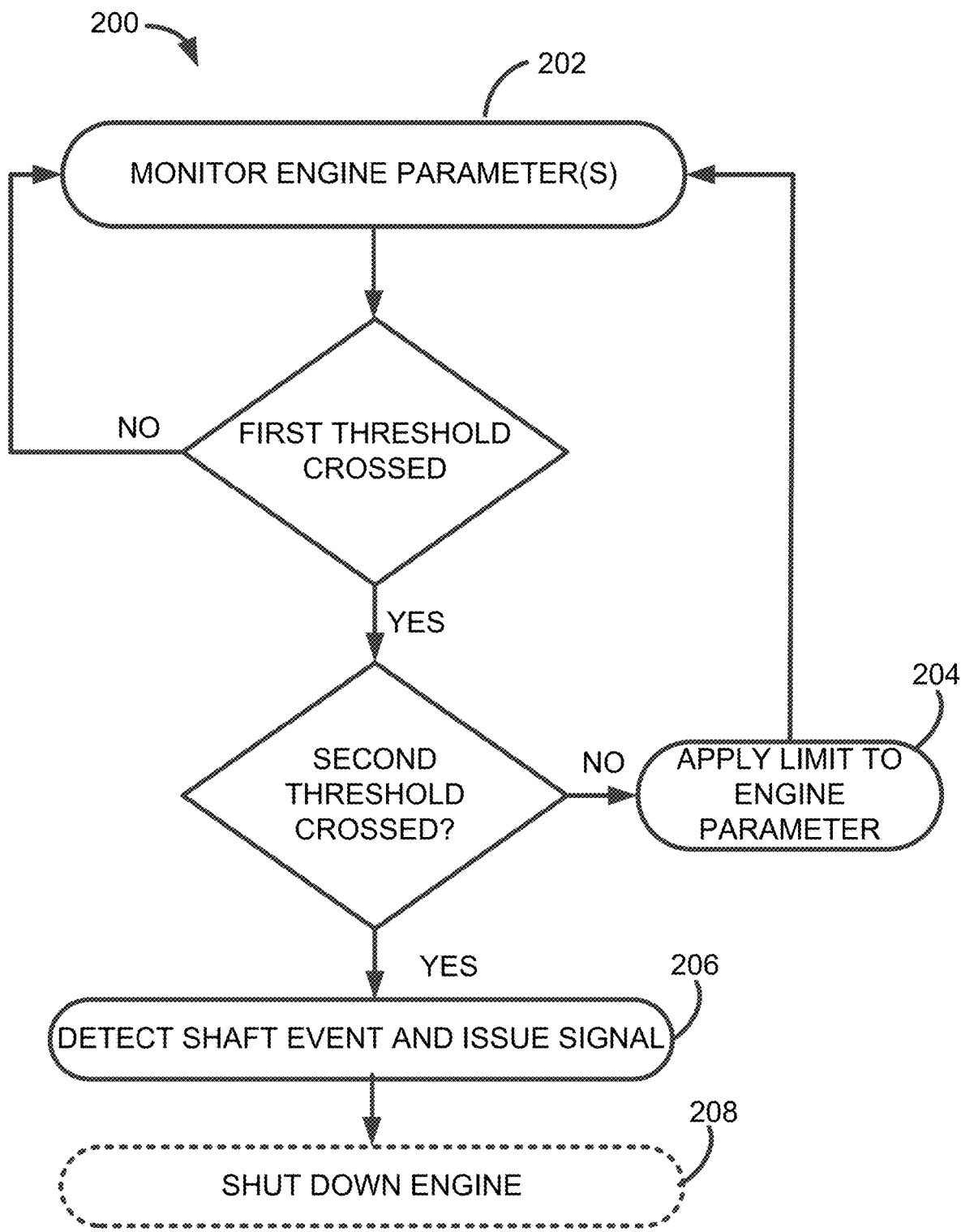
FIGS. 2A-2B are flowcharts illustrating examples of a method for detecting a shaft event of a gas turbine engine.

In some embodiments, the engine control system 30 is configured for detecting a shaft event of the engine 10. Referring to FIG. 2A, there is illustrated an example of a method 200 for detecting the shaft event, as performed by the engine control system 30 or another device or system communicating therewith. At step 202, at least one engine parameter is monitored and compared to a schedule. Engine parameters may be monitored directly using sensors coupled to the engine, such as pressure sensors, temperature sensors, speed sensors, acceleration sensors, and the like. Engine parameters may also be determined from parameters measured by the one or more sensors coupled to the engine.

The schedule defines a first threshold and a second threshold greater than the first threshold for the at least one engine parameter. The first threshold is a parameter limiting threshold, the second threshold is a detection threshold for the shaft event.

When the at least one engine parameter is inside a parameter limiting region between the first threshold and the second threshold, i.e. the first threshold has been crossed but not the second threshold, a limit is applied to the at least one parameter at step 204. The first threshold separating the parameter limiting region from a normal operating region, the second threshold separating the parameter limiting region from a hazardous operating region. The parameter limiting region encompasses non-hazardous engine operating conditions and values for the at least one engine parameter that may lead to false positives.

When the at least one engine parameter crosses the second threshold, a shaft event is detected and a signal is issued in response to the detecting, as per step 206.

In some embodiments, the signal issued is an alert signal indicative of the shaft event. The alert may be send to an aircraft operator, an engine operator, and the like. The alert may be a visual alert, an audio alert, a text alert, or of any other nature used to inform an operator of the shaft event. In some embodiments, the signal issued causes a shutdown of the engine, as per step 208 of the method 200. For example, the signal may cause a valve of the fuel control system 32 to close, thus cutting off the engine's fuel supply and causing an engine shutdown.

The at least one engine parameter to which the limit is applied is a parameter used to detect the shaft event. For example, the engine parameter may be gas generator speed of a turboprop engine, or fan speed of a turbofan engine. Other examples include low pressure turbine speed, engine power, combustor pressure, turbine inlet temperature, and fuel flow. The region defined by the first threshold and the second threshold is designed to give the engine control system 30 monitoring the engine parameters adequate time to react to false positives. If the failure condition is not present, the engine parameter causing the first threshold to be crossed is limited to the value of the first threshold. If the failure condition is indeed present, the engine control system 30 will not have time to apply the limit to the engine parameter and the detection threshold will be crossed, thus causing a true detection of the shaft event.

In some embodiments, the at least one engine parameter comprises two or more parameters. This may be accomplished using multiple thresholds, or by using a physical relationship between the two or more parameters to create a synthesized parameter which is used as a limit with a single threshold. Other embodiments are also considered.

Figure 2B:
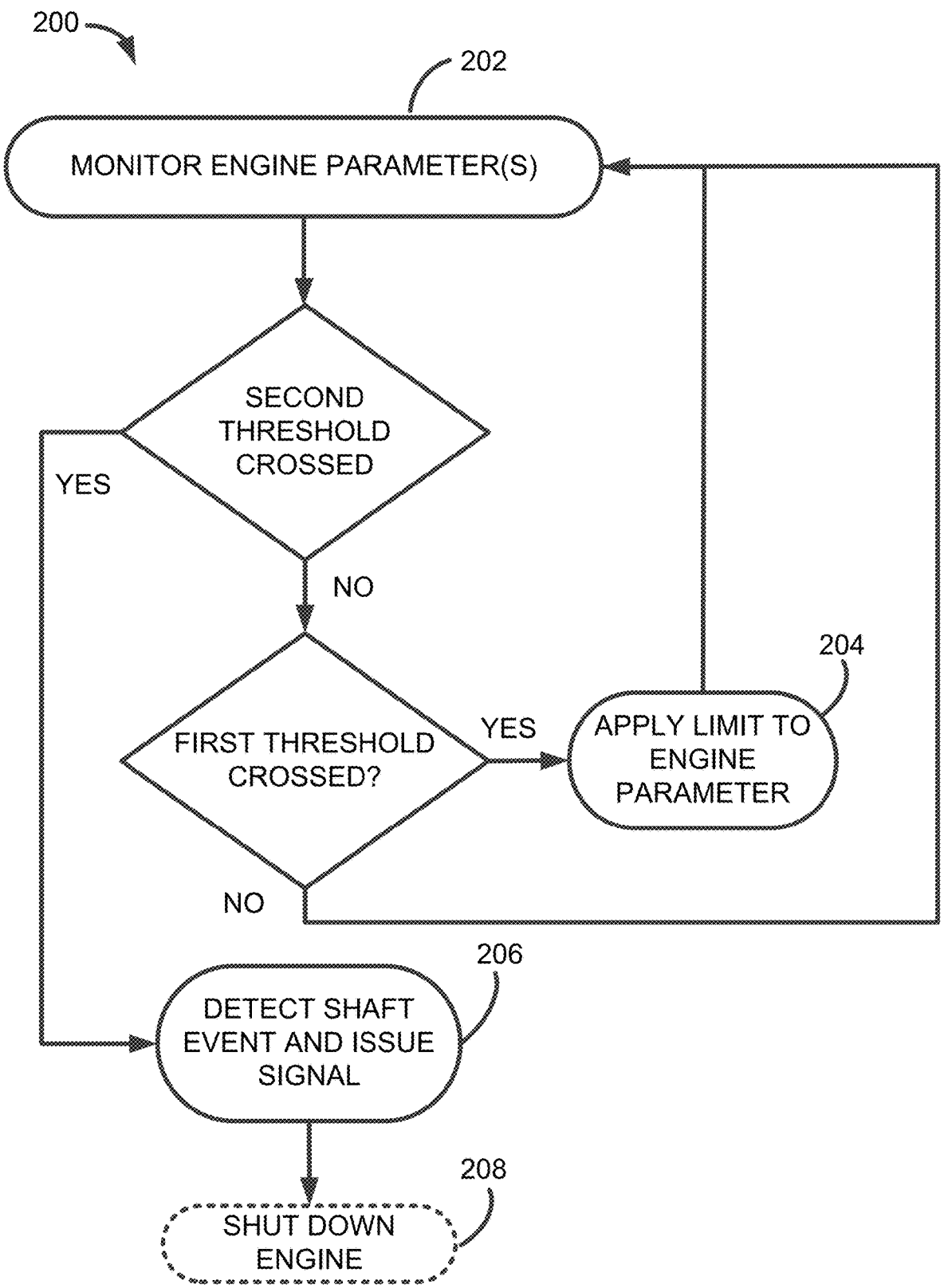

In FIG. 2A, the method 200 is illustrated as first determining whether the first threshold is crossed and if so, then determining if the second threshold is crossed. This is for illustration purposes only in order to demonstrate some notions disclosed herein. The steps of the method 200 may also be rearranged, as illustrated in FIG. 2B. In this example, the second threshold is verified before the first threshold. If it is determined that the second threshold has been crossed, a shaft event is detected and a signal is issued at step 206. If the second threshold has not been crossed, a determination is made as to whether the first threshold has been crossed. If so, the limit is applied to the engine parameter at step 204 to prevent the engine parameter from triggering a false positive. If the first threshold has not been crossed, engine parameters continue to be monitored at step 202.

It will be understood that various practical implementations may be used to perform the method 200. For example, separate monitoring hardware may be used, such that comparisons to the first and second thresholds are performed independently and/or concurrently.

More generally, there are certain identifiers that are unique to a shaft event that allows the control system, such as engine control system 30, to differentiate a true shaft event from a false positive. The first and second thresholds use these identifiers to catch the false positives while allowing the shaft event to be detected.

Figure 2C:
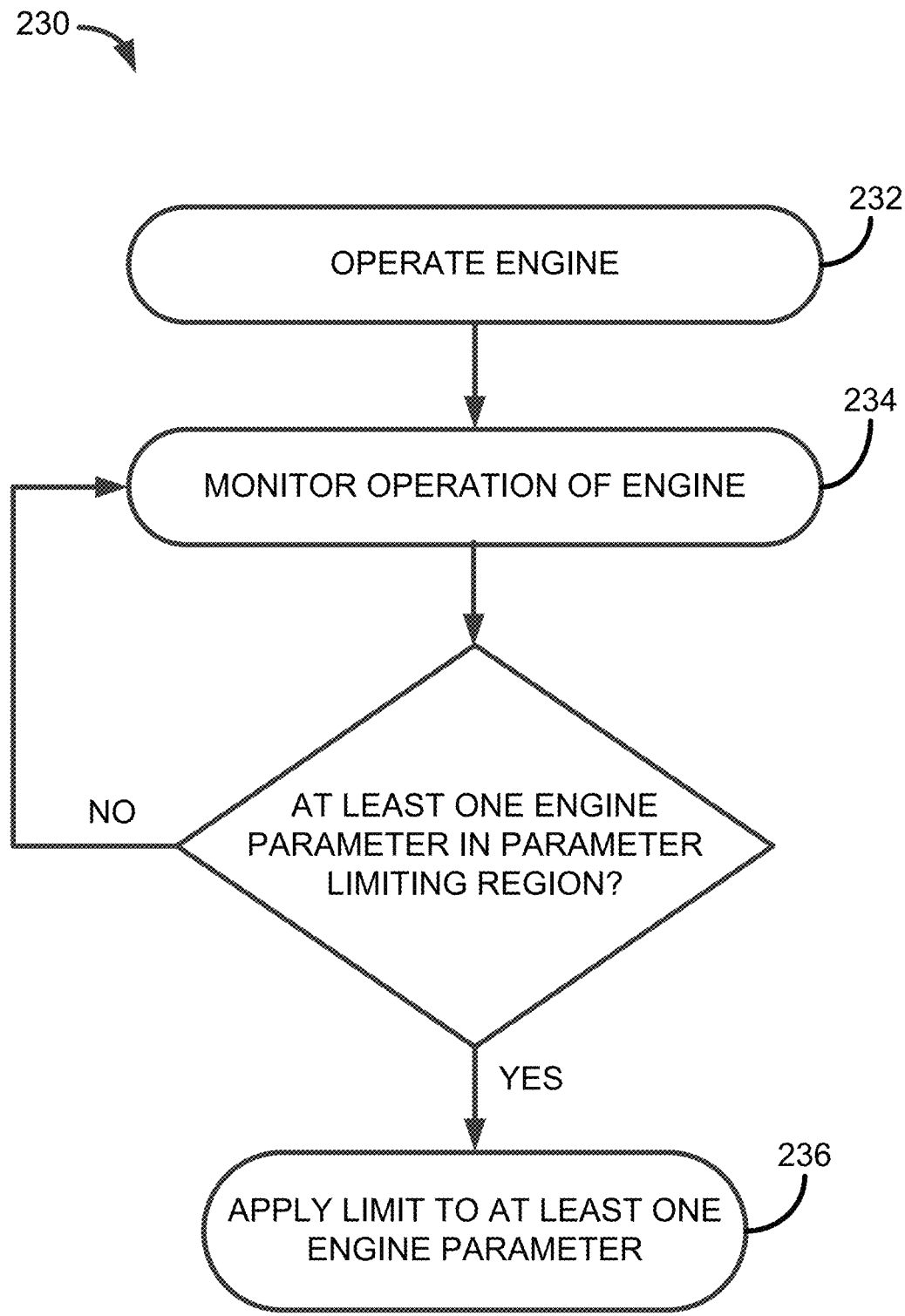
FIG. 2C is a flowchart illustrating an example method for reducing a likelihood of a false positive shutdown of an aircraft engine.

In some embodiments, the notions described herein are applied to a method for reducing a likelihood of a false-positive shutdown of a multi-spool gas turbine engine of an aircraft. An example is shown in FIG. 2C. A method 230 comprises operating the engine, at step 232, of a multi-spool gas turbine engine of an aircraft. At step 234, operation of the engine is monitored at a plurality of points in time. This monitoring may be discrete, for example at periodic or non-periodic points in time, or continuous. Based on the monitoring, at each point in time, a value is determined for at least one engine parameter. This value is compared to a first threshold and a second threshold defining a parameter limiting region. The first threshold separates the parameter limiting region from a normal operating operation region. The second threshold separates the parameter limiting region from a hazardous operating region.

When the at least one engine parameter is found to be in the parameter limiting region, a limit is applied to the at least one engine parameter at step 236. In some embodiments, the limit applied corresponds to the first threshold, or the lower boundary of the parameter limiting region. Other values may be used for the limit.

In some embodiments, the first and/or second threshold are determined dynamically. In some embodiments, the first threshold is set as a function of a response time of a control system of the engine. In some embodiments, a multidimensional lookup table is used to determine whether the engine parameter is within the parameter limiting region.

Figure 3:
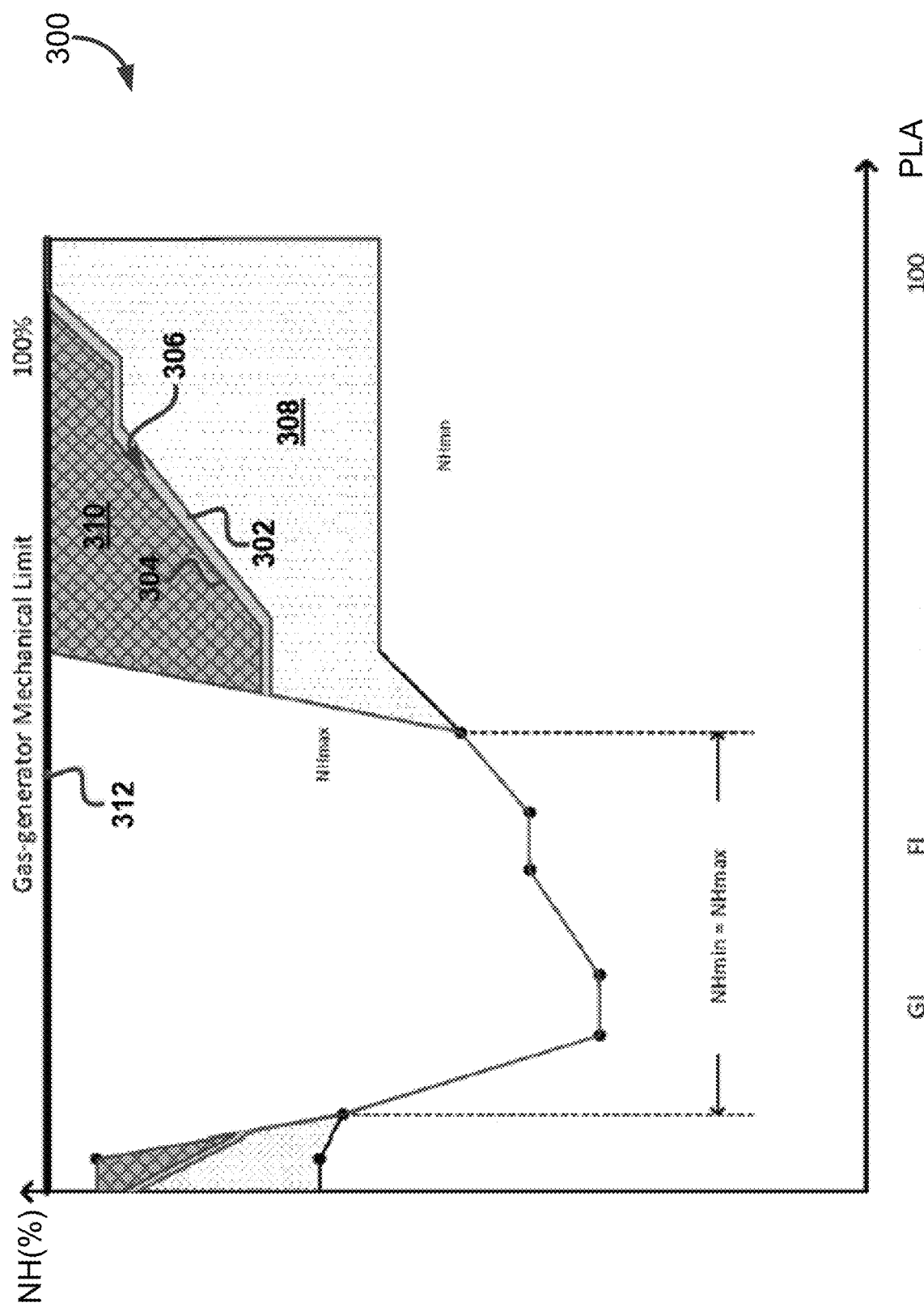
FIG. 3 is a graph of an example schedule for gas generator speed.

A specific and non-limiting example is shown in FIG. 3 for a three spool turboprop engine. A schedule 300 defines a first threshold 302 and a second threshold 304 for gas generator speed, which corresponds to the engine parameter in this example. The thresholds 302, 304 are plotted on a graph of generator speed (y-axis) vs power lever angle (PLA) (x-axis). A safety margin 306 is defined between the first threshold 302 (i.e. the parameter limiting threshold) and the second threshold 304 (i.e. the detection threshold). Below the first threshold 302 is a region 308 of regular operation. Above the second threshold 304 is a shutdown region 310. The mechanical limit 312 of the gas generator forms the upper border of the shutdown region 310.

The parameter limiting threshold 302 may be static or dynamic. A static threshold is pre-determined while a dynamic threshold is determined in real time or pseudo real time, as a function of one or more parameters. The threshold may be of a constant value or of varying value as a function of one or more other parameter, as is illustrated in FIG. 3 where the threshold varies with respect to a power lever angle (PLA), which controls a power reference for the engine. It will be understood that the thresholds are not directly dependent on PLA.

In the example of FIG. 3, the parameter limiting threshold 302 influences the maximum gas generator speed limit for a given set of input parameters, namely shaft torque, ambient pressure and airspeed. The shutdown region 310 is determined by the detection threshold 304 and the parameter limiting threshold 302 is determined by the safety margin 306 applied to the detection threshold 304. The safety margin 306 may be designed through simulation and/or testing, as a function of a plurality of operating parameters and conditions. It may be designed to prevent excursions of the gas generator speed into the shutdown region 310 due to transient overshoots without interfering with the acceleration of the engine. To effectively design threshold 304, the characteristic behaviour of the engine may be examined such that for all known scenarios (i.e. normal operation, surge, etc), the engine does not cross threshold 304. When designing threshold 302, the same engine data may be examined to design the threshold 302 around the acceleration characteristic of the engine.

In some embodiments, the detection threshold 304 is the detection threshold used by any known method of detecting a shaft event. For example, the detection threshold may be as described in U.S. Pat. Nos. 10,180,078, 10,436,060, or U.S. Patent Application Publication No. 2019-0292936. A safety margin is applied to this detection threshold to capture false positives and limit an engine parameter such as gas generator speed to the value of the parameter limiting threshold.

The method 200 may be applicable to any engine application where a detection threshold is used to shut down the engine and the control system has the ability to control the output variable. The examples used herein show the output variable as the gas generator speed. In other practical applications, the output variable may be low pressure turbine speed, fuel flow, or other parameters.

Figure 4:
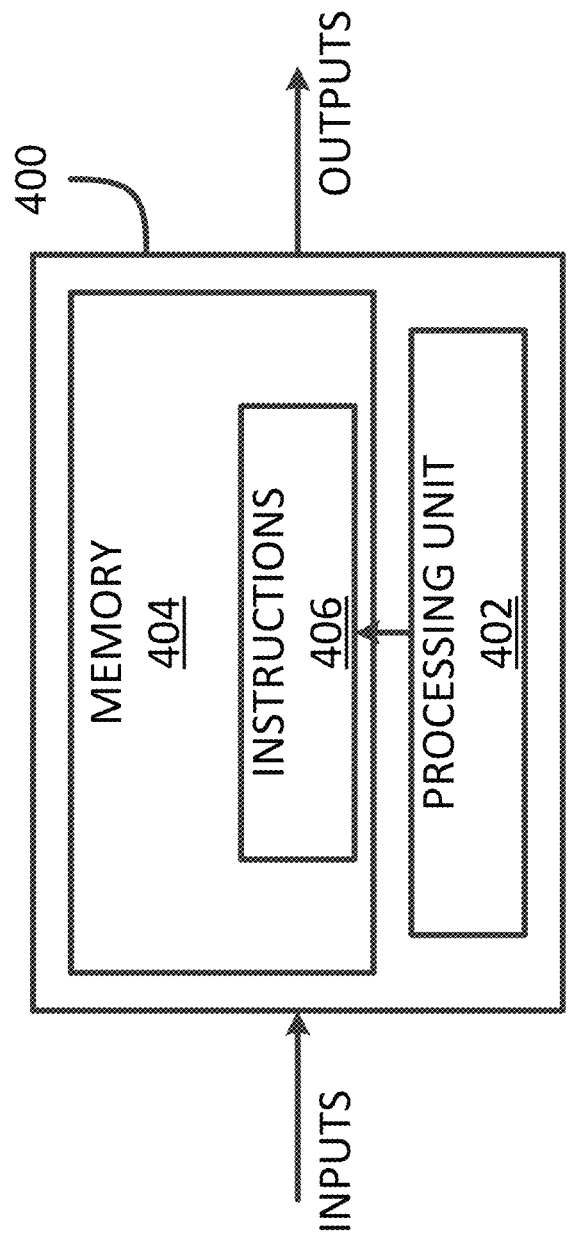
FIG. 4 is a block diagram of an example computing device for implementing parts or all of the method of FIG. 2A-2B.

With reference to FIG. 4, an example of a computing device 400 is illustrated. The engine control system 30 may be implemented with one or more computing devices 400. Note that the engine control system 30 can be implemented as part of a full-authority digital electronic controls (FADEC) or other similar device, including engine electronic controller (EEC), engine control unit (ECU), electronic propeller control, propeller control unit, and the like. Other embodiments may also apply.

The computing device 400 comprises a processing unit 402 and a memory 404 which has stored therein computer-executable instructions 406. The processing unit 402 may comprise any suitable devices configured to implement the method 200 such that instructions 406, when executed by the computing device 400 or other programmable apparatus, may cause the functions/acts/steps performed as part of the method 200 as described herein to be executed. The processing unit 402 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 404 may comprise any suitable known or other machine-readable storage medium. The memory 404 may comprise non-transitory computer readable storage medium, for example, but not limited to, an electronic, magnetic, optical, electromagnetic, infrared, or semiconductor system, apparatus, or device, or any suitable combination of the foregoing. The memory 404 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 404 may comprise any storage means (e.g., devices) suitable for retrievably storing machine-readable instructions 406 executable by processing unit 402.

The methods and systems for detecting a shaft event described herein may be implemented in a high level procedural or object oriented programming or scripting language, or a combination thereof, to communicate with or assist in the operation of a computer system, for example the computing device 400. Alternatively, the methods and systems for detecting a shaft event may be implemented in assembly or machine language. The language may be a compiled or interpreted language. Program code for implementing the methods and systems for detecting a shaft event may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for detecting a shaft event may also be considered to be implemented by way of a non-transitory computer-readable storage medium having a computer program stored thereon. The computer program may comprise computer-readable instructions which cause a computer, or more specifically the processing unit 402 of the computing device 400, to operate in a specific and predefined manner to perform the functions described herein, for example those described in the method 200.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the engine control system 30 may implement a traditional detection method and a separate computing device, such as computing device 400, may communicate with the engine control system 30 to apply the safety margin and the parameter limiting threshold. Yet further modifications could be implemented by a person of ordinary skill in the art in view of the present disclosure, which modifications would be within the scope of the present technology.

The invention claimed is:

1. A method for detecting a shaft event of a gas turbine engine, the method comprising:
monitoring at least one engine parameter and comparing the at least one engine parameter to a schedule for the at least one parameter defining a first threshold and a second threshold greater than the first threshold;
applying a limit to the at least one engine parameter when the at least one engine parameter is inside a parameter limiting region between the first threshold and the second threshold, the first threshold separating the parameter limiting region from a normal operating region, the second threshold separating the parameter limiting region from a hazardous operating region; and
detecting the shaft event when the at least one engine parameter crosses the second threshold and issuing a signal in response to the detecting.

2. The method of claim 1, wherein the gas turbine engine is a turboprop engine.

3. The method of claim 2, wherein the turboprop engine has at least three spools.

4. The method of claim 1, wherein the second threshold is a function of gas generator speed and shaft torque of the engine.

5. The method of claim 1, wherein the signal issued in response to the detecting causes an automatic shutdown of the gas turbine engine.

6. The method of claim 1, wherein the at least one engine parameter is gas generator speed of the engine.

7. The method of claim 1, wherein at least one of the first threshold and the second threshold is a dynamic threshold.

8. The method of claim 1, wherein the engine is a turbofan engine, the at least one engine parameter is fan speed, and the second threshold is a function of fan speed and shaft torque of the engine.

9. A system for detecting a shaft event of a gas turbine engine, the system comprising:
a processing unit; and
a non-transitory computer-readable medium having stored thereon program instructions executable by the processing unit for:
monitoring at least one engine parameter and comparing the at least one engine parameter to a schedule for the at least one parameter defining a first threshold and a second threshold greater than the first threshold;
applying a limit to the at least one engine parameter when the at least one engine parameter is inside a parameter limiting region between the first threshold and the second threshold, the first threshold separating the parameter limiting region from a normal operating region, the second threshold separating the parameter limiting region from a hazardous operating region; and
detecting the shaft event when the at least one engine parameter crosses the second threshold and issuing a signal in response to the detecting.

10. The system of claim 9, wherein the gas turbine engine is a turboprop engine.

11. The system of claim 10, wherein the turboprop engine has at least three spools.

12. The system of claim 9, wherein the second threshold is a function of gas generator speed and shaft torque of the engine.

13. The system of claim 9, wherein the signal issued in response to the detecting causes an automatic shutdown of the gas turbine engine.

14. The system of claim 9, wherein the at least one engine parameter is gas generator speed of the engine.

15. The system of claim 9, wherein at least one of the first threshold and the second threshold is a dynamic threshold.

16. The system of claim 9, wherein the engine is a turbofan engine, the at least one engine parameter is fan speed, and the second threshold is a function of fan speed and shaft torque of the engine.

17. A method for reducing a likelihood of a false-positive shutdown of a multi-spool gas turbine engine of an aircraft, the method comprising:
operating the engine;
monitoring operation of the engine at a plurality of points in time, and based on the monitoring, at each point in time of the plurality of points in time, determining a value for at least one engine parameter and comparing the value to a first threshold and a second threshold defining a parameter limiting region, the first threshold separating the parameter limiting region from a normal operating region, the second threshold separating the parameter limiting region from a hazardous operating region; and
in response to the at least one parameter being in the parameter limiting region, applying a limit to the at least one engine parameter.

18. The method of claim 17, wherein at least one of the first threshold and the second threshold are determined dynamically.

19. The method of claim 17, wherein the first threshold is set as a function of a response time of a control system of the engine.

20. The method of claim 17, wherein comparing the value to the first threshold and the second threshold comprises retrieving the first threshold and the second threshold from a multidimensional lookup table.

* * * * *